(12) United States Patent
Jeong

(10) Patent No.: US 11,548,421 B2
(45) Date of Patent: Jan. 10, 2023

(54) HEADREST LOCKING DEVICE

(71) Applicant: WOOBO TECH CO., LTD., Gyeonggi-do (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 17/268,253

(22) PCT Filed: Nov. 29, 2018

(86) PCT No.: PCT/KR2018/015018
§ 371 (c)(1),
(2) Date: Feb. 12, 2021

(87) PCT Pub. No.: WO2020/036263
PCT Pub. Date: Feb. 20, 2020

(65) Prior Publication Data
US 2021/0316645 A1    Oct. 14, 2021

(30) Foreign Application Priority Data
Aug. 14, 2018 (KR) .................. 10-2018-0094877

(51) Int. Cl.
*B60N 2/818* (2018.01)
*B60N 2/815* (2018.01)

(52) U.S. Cl.
CPC ............ *B60N 2/818* (2018.02); *B60N 2/815* (2018.02)

(58) Field of Classification Search
CPC ................................ B60N 2/818; B60N 2/815
See application file for complete search history.

(56) References Cited

U.S. PATENT DOCUMENTS 4,256,341 A * 3/1981 Goldner ............. B60N 2/818
297/410
6,464,294 B1 * 10/2002 Kain .................. B60N 2/2872
297/410

(Continued)

FOREIGN PATENT DOCUMENTS

EP     0 864 461 B1    7/2000
JP       4435151 B2    3/2010

(Continued)

OTHER PUBLICATIONS

International Searching Authority/KR, International Search Report and Written Opinion of the International Searching Authority, Application No. PCT/KR2018/015018, dated Mar. 22, 2019, 8 pages.

*Primary Examiner* — David R Dunn
*Assistant Examiner* — Tania Abraham
(74) *Attorney, Agent, or Firm* — Sunstein LLP

(57) ABSTRACT

The present invention relates to a headrest locking device, and more particularly, to a headrest locking device including a case and a lock plate slidably accommodated in the case and inserted in an engaging groove of a stay rod. Here, a horizontal tension rib is located between the lock plate and the case. The horizontal tension rib applies an elastic force to the lock plate in a direction different from a sliding direction of the lock plate, and the lock plate has a panel shape formed by integrating a body inserted into the engaging groove with the horizontal tension rib. A gap between the lock plate and the case is eliminated and a restoring function is embodied at the same time, and manufacturing costs of the lock plate are reduced.

10 Claims, 8 Drawing Sheets

(56) References Cited

U.S. PATENT DOCUMENTS

| | | | |
|---|---|---|---|
| 7,887,135 B2 * | 2/2011 | Oda .................. | A47C 1/036 |
| | | | 297/410 |
| 9,004,602 B2 * | 4/2015 | Gottwald ............ | B60N 2/818 |
| | | | 297/391 |
| 9,085,253 B2 * | 7/2015 | Delling .............. | B60N 2/891 |
| 9,114,744 B2 * | 8/2015 | Groenninger ....... | B60N 2/818 |
| 10,238,215 B2 * | 3/2019 | Peterson ............ | A47C 1/03255 |
| 10,493,888 B2 * | 12/2019 | Hoffmann ........... | B60N 2/815 |
| 10,576,860 B2 * | 3/2020 | Switalski ........... | B60N 2/818 |
| 10,829,019 B2 * | 11/2020 | Dexter ............... | B60N 2/643 |
| 2006/0214491 A1 | 9/2006 | Metz et al. | |
| 2014/0182404 A1 * | 7/2014 | Jeong ................. | B60N 2/818 |
| | | | 74/89.23 |
| 2020/0031262 A1 * | 1/2020 | Jiang ................. | B60N 2/865 |

FOREIGN PATENT DOCUMENTS

| | | |
|---|---|---|
| KR | 10-0539835 B1 | 3/2006 |
| KR | 10-1231013 B1 | 2/2013 |
| KR | 10-2013-0045404 A | 5/2013 |
| KR | 10-1372955 B1 | 3/2014 |
| KR | 20-2015-0000161 | 1/2015 |
| KR | 10-2015-0138446 A | 12/2015 |
| KR | 10-1684319 B1 | 12/2016 |
| KR | 10-1881056 B1 | 7/2018 |

* cited by examiner

[Figure 1]
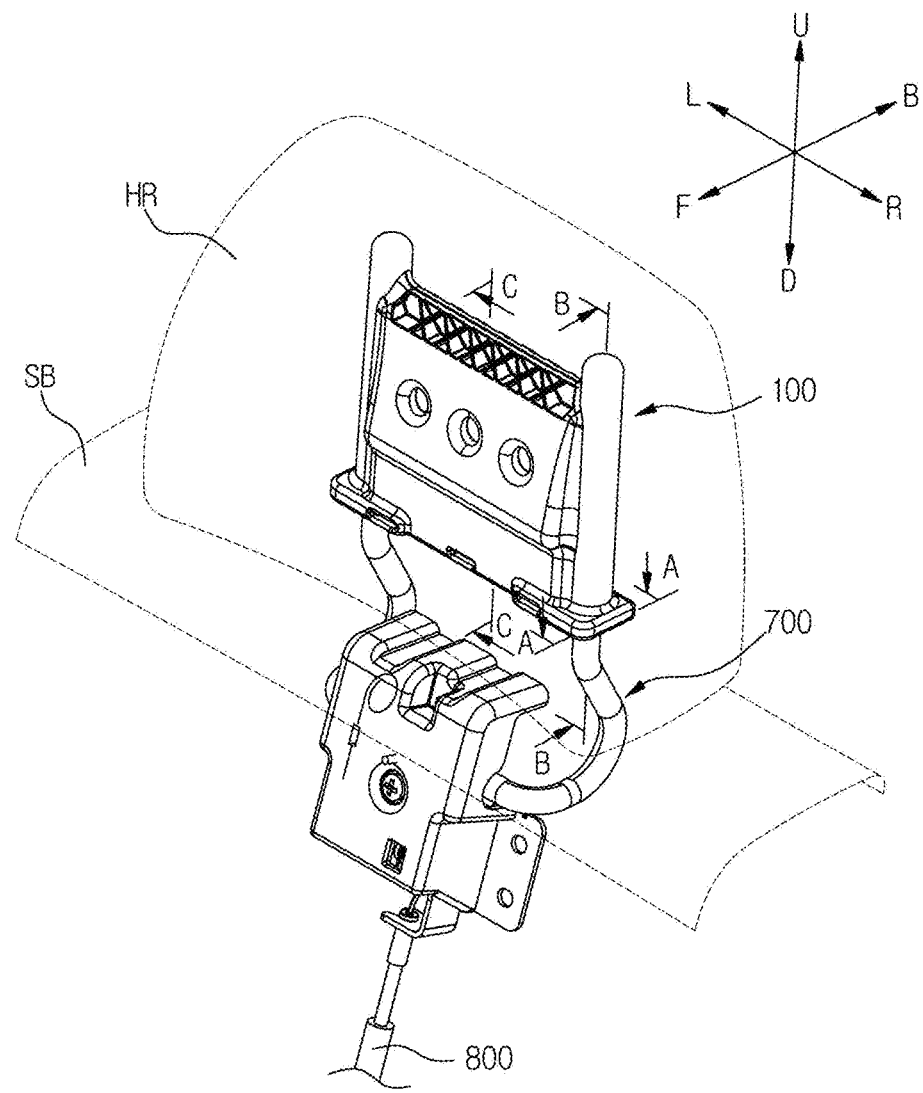

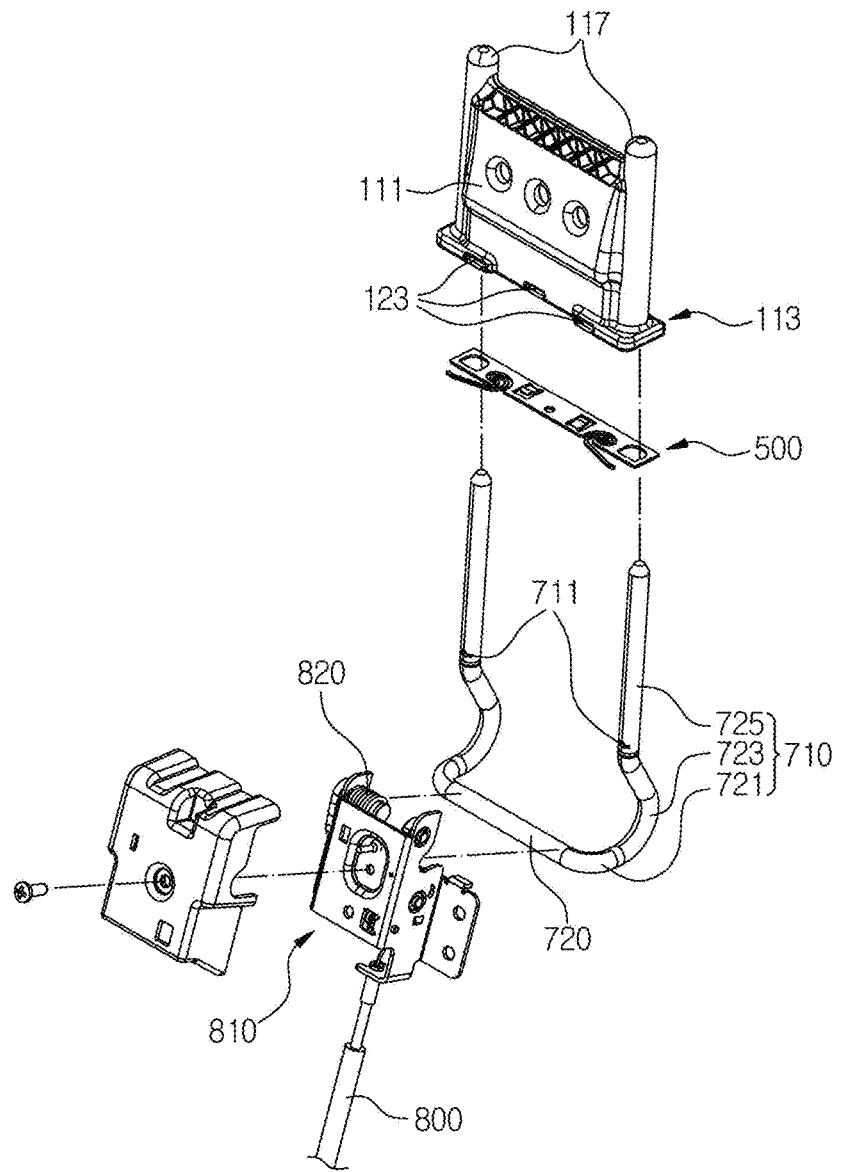
【Figure 2】

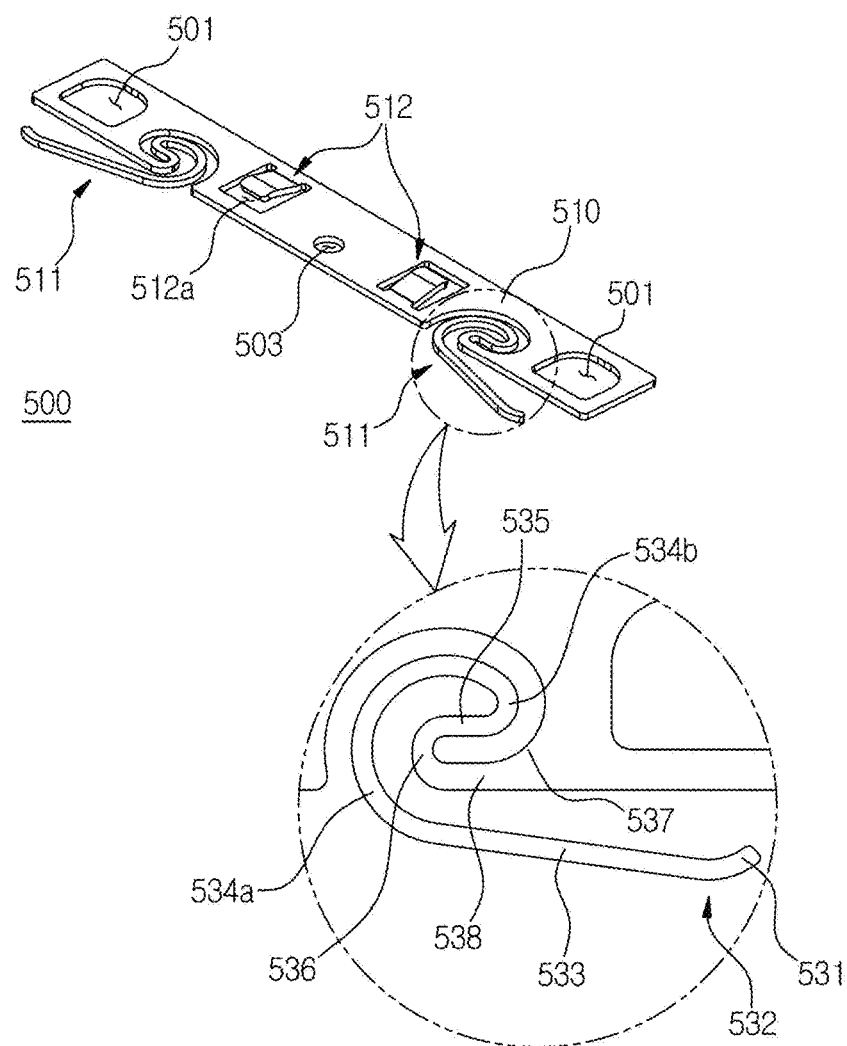
[Figure 3]
[Figure 4]
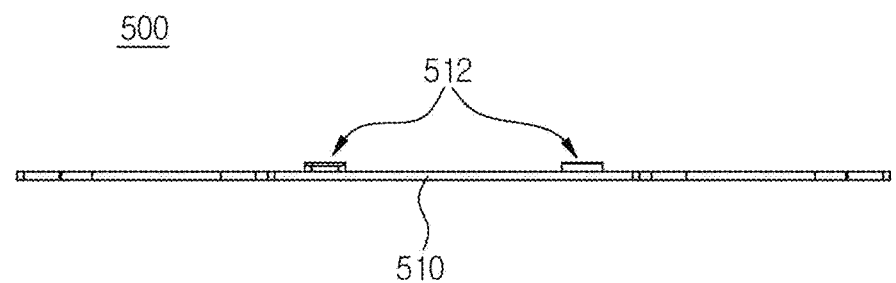

[Figure 5]
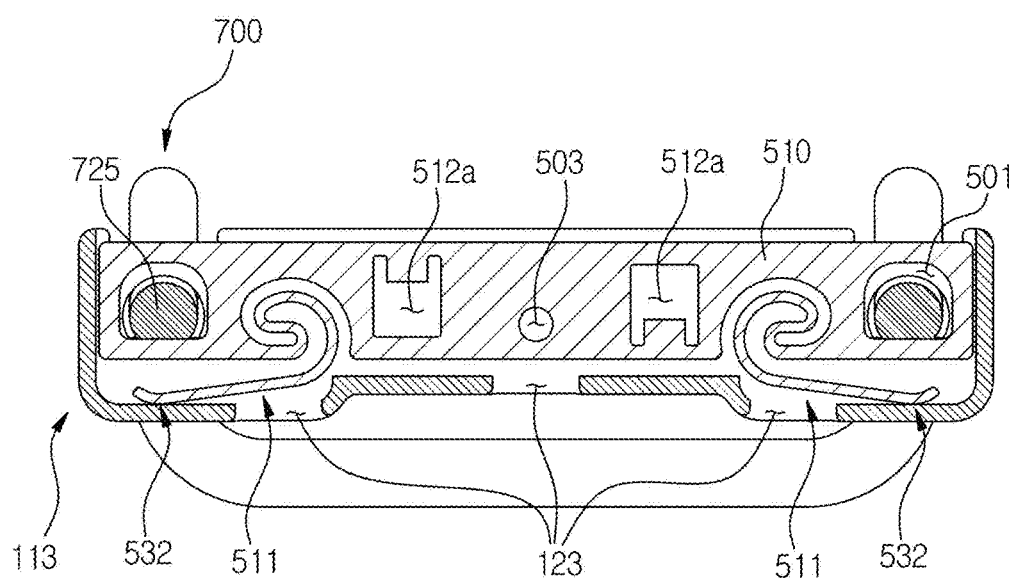

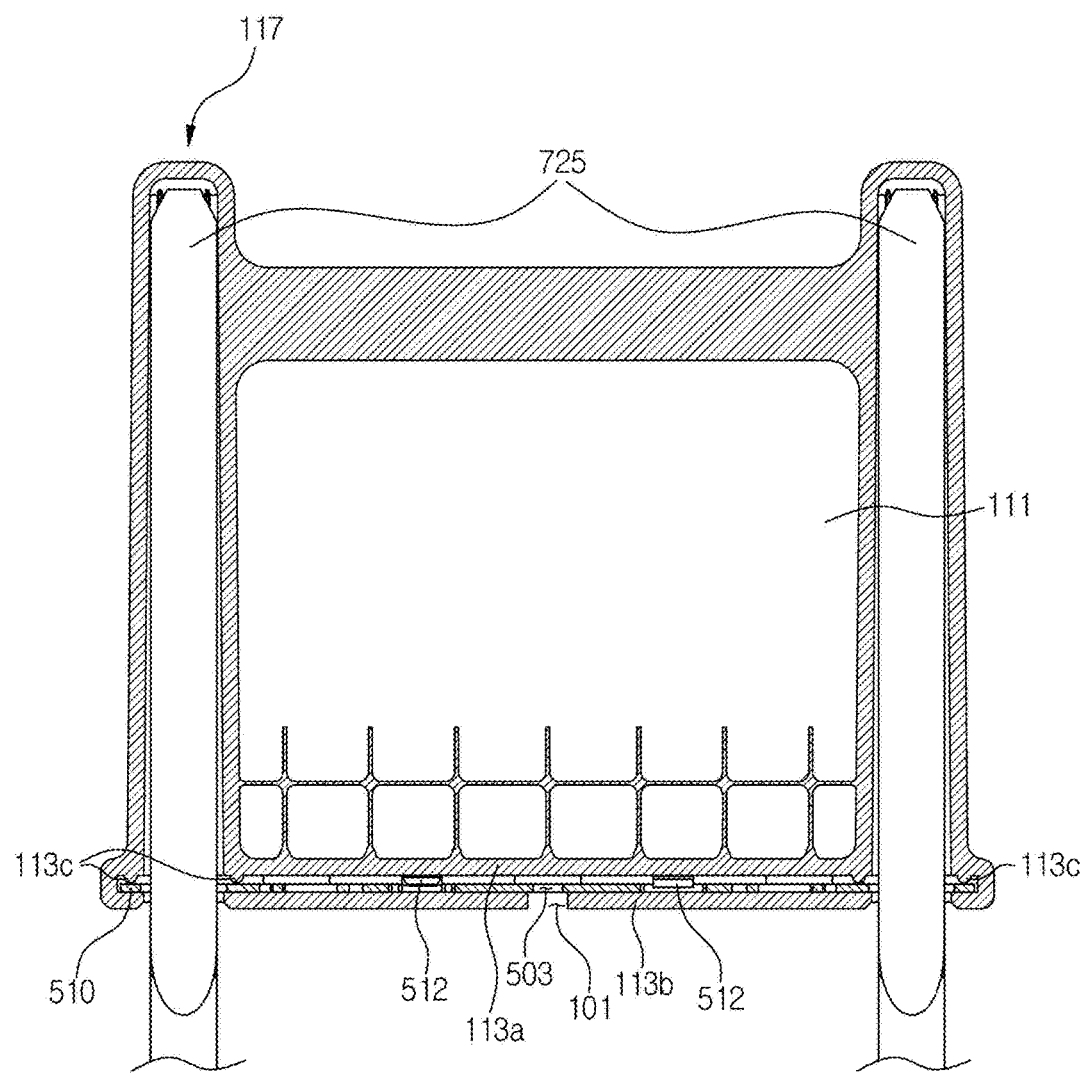
[Figure 6]

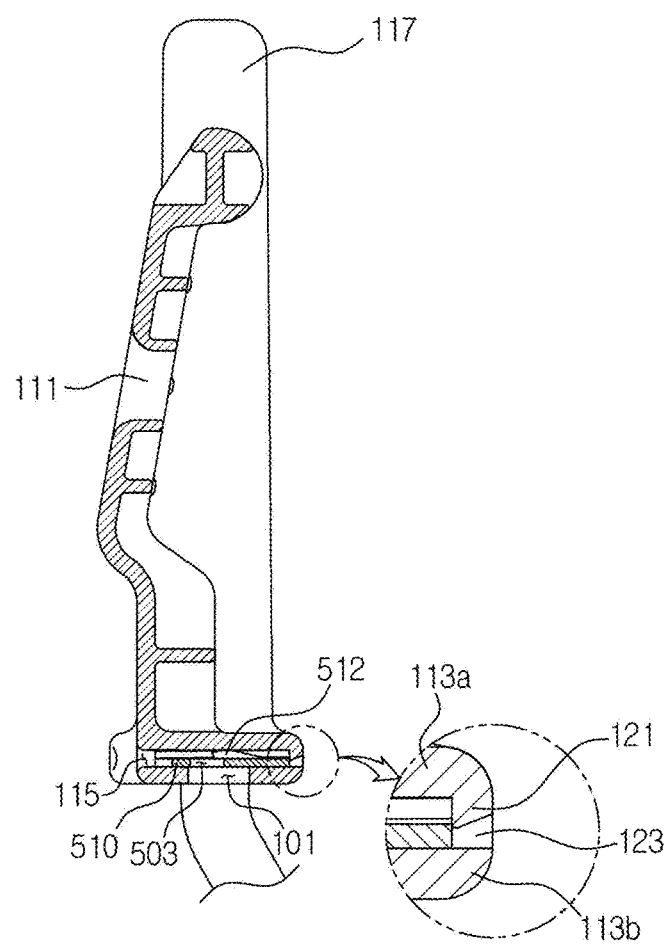
[Figure 7]

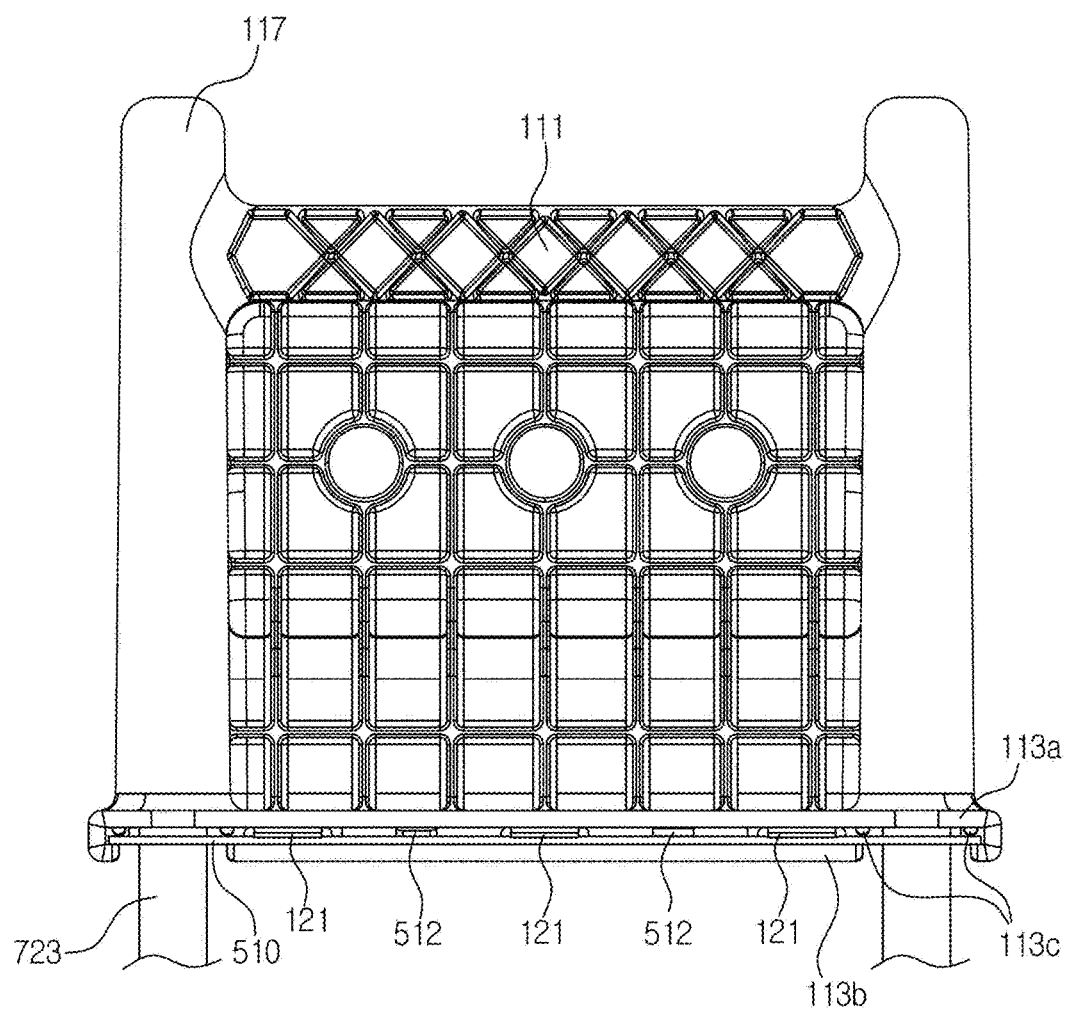
[Figure 8]

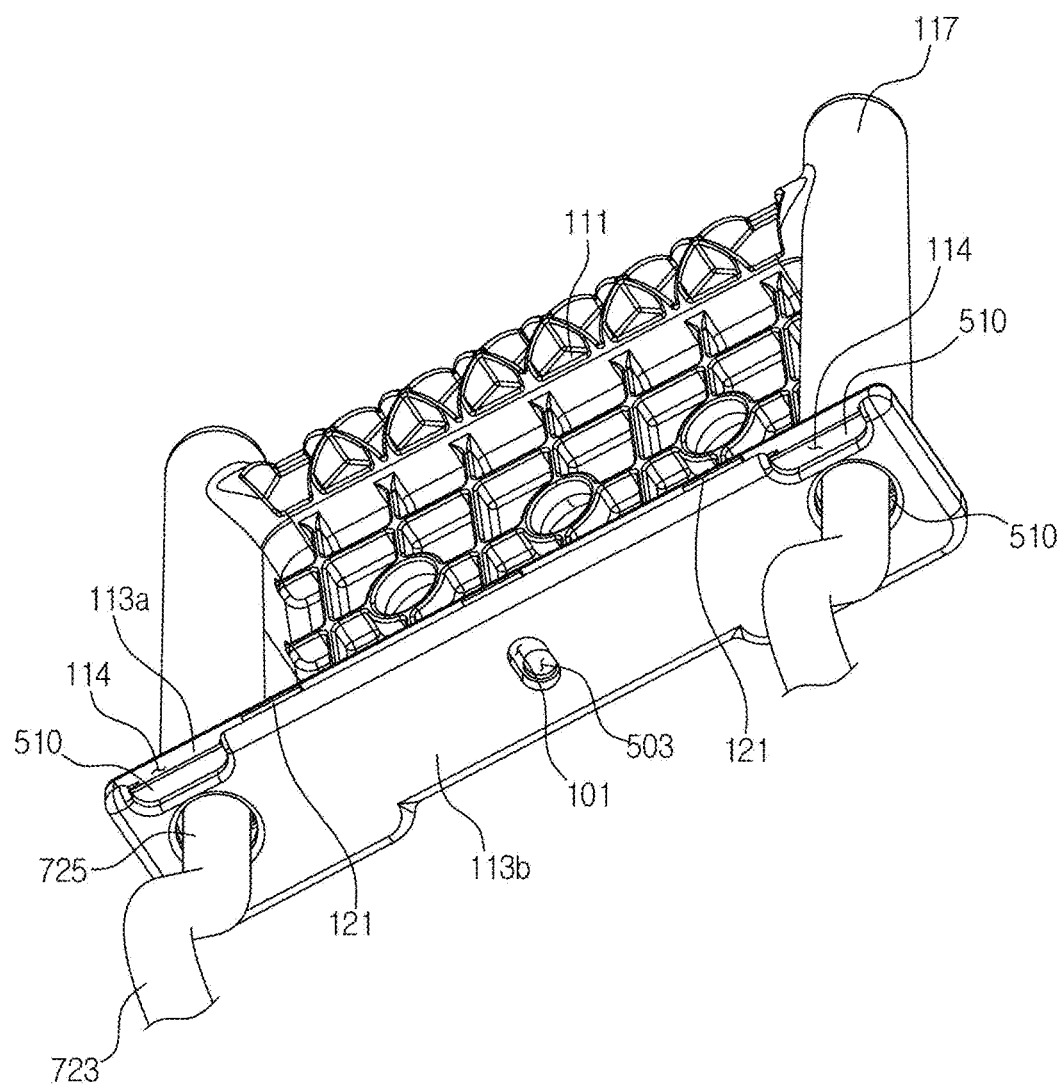
[Figure 9]

HEADREST LOCKING DEVICE

This application is the national phase entry of international patent application no. PCT/KR2018/015018, filed Nov. 29, 2018 and claims the benefit of Korean patent application No. 10-2018-0094877, filed Aug. 14, 2018, the disclosures of which are incorporated herein by reference in their entirety.

TECHNICAL FIELD

The present invention relates to a headrest locking device, and more particularly, to a headrest locking device including a lock plate which fixes and unfixes stay rods of a headrest.

BACKGROUND ART

A headrest locking device disclosed in Korean Patent Registration No. 10-1684319 (hereinafter, referred to as Patent Document 1) includes a main bracket mounted on a seat back, a stay mounted in a headrest and rotated with respect to the main bracket to move between an upright (unfolded) position and a folded position, a locking mechanism which locks the stay in the upright position with respect to the main bracket, and a pulling member which is an operation member operated to release a locked state of the locking mechanism.

The stay includes a horizontal bar, a vertical bar vertically extending backward from both ends of the horizontal bar, and an inclined bar extending from the vertical bar to be inclined toward an upper front.

The locking mechanism includes a lock link fixed to the horizontal bar of the stay, a first distortion coil spring having one end supported by the main bracket and the other end supported by the horizontal bar, a release lever, a ratchet provided between the lock link and the release lever, a second distortion coil spring having one end supported by the main bracket and the other end supported by the release lever, and a third distortion coil spring for returning of the ratchet.

The lock link includes left and right lock links fixed to both sides of the horizontal bar. The right lock link includes a right link plate, a right hinge hole formed at a top of the right link plate, a gable-shaped groove formed at a bottom end of the right link plate, and a right rear groove formed toward a rear side of the right link plate and inserted in and fixed to the horizontal bar. The right hinge hole with a right hinge shaft being inserted therein is supported by a first hinge hole for a right side plate.

According to the device of Patent Document 1 configured as described above, a contact state is maintained in which the gable-shaped groove of the lock link and a gable-shaped protrusion of the ratchet are docked on each other in the case of the locking mechanism when the stay is locked (upright).

Also, a rear end of the release lever is disposed to be inclined in a posture of pushing and lifting up the ratchet in a diagonal direction.

When the pulling member is pulled down in the locked state, the release lever rotates around a second hinge shaft clockwise and an engaging step pulls down an engaging protrusion of the ratchet.

Then, the engaging protrusion rotates the ratchet counterclockwise with respect to the axis of the earth. The counterclockwise rotation of the ratchet allows the docked gable-shaped protrusion to deviate from the gable-shaped groove.

When the gable-shaped protrusion deviates from the gable-shaped groove, the stay rotates (revolves) with respect to a first hinge shaft due to the first distortion coil spring and moves to a folded position. That is, a rotational center of the horizontal bar of the stay is changed.

When pulling of the pulling member is released immediately after the gable-shaped protrusion deviates from the gable-shaped groove, on the other hand, the release lever rotates counterclockwise through the second hinge shaft due to the second distortion coil spring and the ratchet rotates clockwise through the axis of the earth due to the third distortion coil spring such that the engaging protrusion of the ratchet pulls up the engaging step and moves upward.

While the stay is unlocked and folded as described above, when a user pushes and lifts the stay to change to the upright state again, the lock link rotates clockwise with respect to the first hinge shaft and the gable-shaped groove is engaged with and completely docked on the gable-shaped protrusion so as to enter the upright state.

As another example of a headrest locking device, in the case of a fixing device and a headrest disclosed in Japanese Patent Registration No. 4435151 (hereinafter, referred to as Patent Document 2), since a spring and a sliding portion which fix and release movement of a rod are separate components, processes of installing the spring and the sliding portion in the fixing device are necessary such that production time increases and manufacturing costs also increase.

As another example of a headrest locking device, in the case of a first embodiment disclosed in Europe Patent Registration No. 0864461 B1 (hereinafter, referred to as Patent Document 3), a process of installing wire springs, which fix and release movement of a rod and are installed on both sides of the rod, is necessary such that production time increases and accordingly manufacturing costs also increase. Also, since a lateral rod, which elastically deforms the wire springs, is connected to the wire springs only in an engaged state, a possibility of releasing the connection therebetween is present.

In a headrest locking device disclosed in Korean Utility Model Publication No. 20-2015-0000161 (hereinafter, referred to as Patent Document 4), a height of a headrest is adjustable only by operating each of stopper devices installed on both sides of a rod, which is very inconvenient, and a process of installing the stopper devices on the both sides of the rod is necessary such that production time increases and accordingly manufacturing costs also increase. Also, when the stopper device is installed on only one side instead of the both sides of the rod, vibrations may occur at the other side of the rod where the stopper device is not installed and at the headrest connected to the other side.

Meanwhile, as a technology which relates to a headrest locking device, Korean Patent Registration No. 10-1881056 (hereinafter, referred to as Patent Document 5), which has been filed by the applicant and registered, discloses a headrest locking device including a case and a lock plate slidable with respect to the case, inserted into an engaging groove of a stay rod, and including a through hole. Here, an elastic rib is disposed between the lock plate and the case. The elastic rib applies an elastic force to the lock plate in a direction different from a sliding direction of the lock plate. A curved portion is formed between both ends of the elastic rib. The curved portion comes into contact with the lock plate or the case, and both ends of the elastic rib are arranged to be spaced apart from a surface with which the curved portion comes into contact.

The lock plate includes a body portion formed of a plastic material, an insert member installed to surround the engaging groove to engage the stay rod and formed of a metal material having strength higher than that of the body portion, and a returning spring which applies an elastic force to the lock plate in a rightward direction.

The stay rods include two vertical rods and a lateral rod which connects top ends of the vertical rods. Accordingly, the lock plate includes two engaging grooves and two insert members. The returning spring is installed on each of left and right sides of the lock plate and a total of two returning springs are installed. Accordingly, in the case of a conventional headrest movement device like Patent Document 5, the lock plate includes a total of five components. Accordingly, a process of assembling the components is necessary such that production time of the lock plate increases and manufacturing costs also increase.

Also, since the insert members and the body are produced through insert-injection, manufacturing costs of the lock plate increase.

DISCLOSURE

Technical Problem

The present invention is directed to providing a headrest locking device in which a lock plate fixing or releasing a position of a stay rod has an integral panel shape so as to reduce a cost thereof.

The present invention is also directed to providing a headrest locking device in which a lock plate having a high elastic effect is installed.

Technical Solution

One aspect of the present invention provides a headrest locking device including a case and a lock plate slidably accommodated in the case and inserted in an engaging groove of a stay rod. Here, a horizontal tension rib is located between the lock plate and the case. The horizontal tension rib applies an elastic force to the lock plate in a direction different from a sliding direction of the lock plate. The lock plate has a panel shape formed by integrating a body inserted into the engaging groove with the horizontal tension rib.

One side of the horizontal tension rib may come into contact with the case, and the other side thereof may be connected to the lock plate. Also, a plurality of curved pieces spaced apart between the one side and the other side may be formed at the horizontal tension rib.

The horizontal tension rib may include a first curved piece connected to the one side, a second curved piece formed between the first curved piece and the lock plate, and a linear piece formed between the first curved piece and the second curved piece.

The first curved piece and the second curved piece may have an arc shape, and the first curved piece may be located farther inside than the second curved piece.

One side of the horizontal tension rib which comes into contact with the case may be located farther leftward or rightward than the curved piece and may be located between one side of the body and one side of the case.

A vertical tension rib, which applies an elastic force in a direction not parallel to the sliding direction of the lock plate, may be formed at the lock plate.

Advantageous Effects

The above-described headrest locking device of the present invention has effects as follows.

A lock plate of the present invention is completely molded through one pressing process so as to be easily molded.

Also, in the present invention, since the lock plate has an integral form, the number of components is significantly reduced in comparison to a conventional technology such that the number of processes of assembling the headrest locking device is also reduced and accordingly manufacturing costs of the present invention are reduced.

Also, the lock plate of the present invention has a high elastic force and has a long life in comparison to a conventional technology.

DESCRIPTION OF DRAWINGS

FIG. 1 is a perspective view of a headrest locking device according to an exemplary embodiment of the present invention.

FIG. 2 is an exploded perspective view of the headrest locking device according to the exemplary embodiment of the present invention.

FIG. 3 is a perspective view of a lock plate according to an exemplary embodiment of the present invention.

FIG. 4 is a front view of the lock plate according to the exemplary embodiment of the present invention.

FIG. 5 is a cross-sectional view taken along a line A-A in FIG. 1.

FIG. 6 is a cross-sectional view taken along a line B-B in FIG. 1.

FIG. 7 is a cross-sectional view taken along a line C-C in FIG. 1.

FIG. 8 is a rear view of the headrest locking device of FIG. 1.

FIG. 9 is a perspective view of the headrest locking device according to the present invention when viewed from below.

MODE FOR INVENTION

Hereinafter, one exemplary embodiment of the present invention will be described in detail with reference to the attached drawings.

For reference, among components of the present invention which will be described below, some of the same conventional technologies will be described with reference to the above-described technology and an additional detailed description thereof will be omitted.

When one part is stated as being disposed "on" another part, the one part may be directly present on the other part or may accompany another part therebetween.

On the other hand, when one part is stated as being disposed "directly on" another part, there is no part disposed therebetween.

Technical terms used herein are merely for stating a particular embodiment and are not intended to limit the present invention. Singular forms used herein, unless clearly defined otherwise, include plural forms. The meaning of "comprising" specifies a particular property, area, integer, step, operation, element, and/or component and does not exclude presence or addition of another particular property, area, integer, step, operation, element, component, and/or group thereof.

The terms which refer to relative spaces such as "below," "above," and the like may be used to more easily describe a relationship between one part and another part shown in the drawing. These terms are intended to include another meaning or operation of a device used with a meaning intended in the drawing. For example, when a device in the drawing is turned upside down, some parts described as being disposed "below" other parts will be described as being disposed "above" other parts. Accordingly, an exemplary term "below" includes both upward and downward directions. The device may rotate by 90 degrees or by another angle, and the terms, which refer to relative spaces, will be interpreted according thereto.

When it is described that one component is "connected" or "joined" to another component, it should be understood that the one component may be directly connected or joined to the other component but another component may be present therebetween.

A width direction of a vehicle is referred to as a lateral direction, a longitudinal direction of the vehicle is referred to as a horizontal direction, and a vertical direction of the vehicle is referred to as a vertical direction. L, R, F, B, U, D shown in FIG. 1 sequentially refer to left, right, front, back, up, and down directions.

As shown in FIGS. 1 to 9, a headrest (HR) locking device according to the embodiment includes a case 100 and a lock plate 500 slidably accommodated in the case 100 and inserted in engaging grooves 711 of a stay rod 700. Here, horizontal tension ribs 511 are located between the lock plate 500 and the case 100 and apply an elastic force to the lock plate 500 in a direction different from a sliding direction of the lock plate 500. The lock plate 500 has a panel shape formed by integrating a body 510 inserted in the engaging grooves 711 with the horizontal ribs 511.

Vertical tension ribs 512, which apply an elastic force in a direction not parallel to the sliding direction of the lock plate 500, are formed in the body 510 of the lock plate 500.

The vertical tension ribs 512 are also integrated with the body 510 and the horizontal ribs 511. As a result, in the present invention, a gap between the lock plate 500 and the case 100 may be eliminated and a restoring function of the lock plate 500 may be simultaneously embodied by the horizontal tension ribs 511.

Since the lock plate 500 having a panel shape is completely formed through one process press, molding is easy. Also, since the lock plate 500 has an integral form, the number of components is significantly reduced in comparison to a conventional technology such that the number of processes for assembling the HR locking device is also reduced and accordingly manufacturing costs of the present invention are reduced. In more detail, the stay rod 700 connected to a bracket 810 is inserted into the case 100 in which the lock plate 500 is inserted such that the HR locking device is completely assembled.

<Stay Rod 700>

The stay rod 700 includes vertical rods 710 inserted in the case 100 and a lateral rod 720 which connects both of the vertical rods 710.

The vertical rods 710 and the lateral rod 720 are integrally formed.

The vertical rod 710 includes a vertical rod 721 bent backward from the lateral rod 720, an inclined rod 723 bent to a rear and upward and then bent to a front and upward from a rear of the vertical rod 721, and an insertion rod 725 formed upward from a top end of the inclined rod 723.

The insertion rod 725 is a part to be inserted in the case 100.

In the embodiment, one engaging groove 711 is formed at a bottom of a front side of the insertion rod 725.

The engaging groove 711 includes an inclined surface which is gradually inclined backward vertically, a first flat surface connected to a bottom of the inclined surface and formed horizontally, a second flat surface disposed below the first flat surface and formed in a vertical direction, and a third flat surface connected to a bottom of the second flat surface and formed in a horizontal direction.

When the engaging groove 711 engages with the lock plate 500, the first flat surface faces a top surface of the lock plate 500 and the third flat surface faces a bottom surface of the body 510 of the lock plate 500. Accordingly, the case 100 is fixed by the lock plate 500 engaged with the engaging grooves 711 and does not move vertically on the basis of the stay rod 700.

<Case 100>

The case 100 according to the embodiment is fixed to the HR.

The case 100 is formed to surround the lock plate 500 and a top side of the stay rod 700.

The case 100 is formed of a plastic material and is molded through injection and the like.

The case 100 includes a protruding portion 111 having a front center which protrudes frontward.

The protruding portion 111 is disposed to be spaced apart from top and bottom ends and left and right ends of the case 100.

A center part between top and bottom of the protruding portion 111 protrudes frontward.

The protruding portion 111 supports the head of a passenger.

Reinforcing ribs are formed in a lattice shape on a rear surface of the protruding portion 111.

A lock plate insertion portion 113 in which the lock plate 500 is inserted is formed at a bottom of the case 100.

The lock plate insertion portion 113 is formed to have a shape corresponding to an external shape of the lock plate 500. The lock plate insertion portion 113 has a shape similar to an approximate rectangular parallelepiped.

The lock plate insertion portion 113 have a left and right length and a horizontally length longer than a left and right length and a horizontally length of the protruding portion 111.

The lock plate insertion portion 113 includes a front portion, both side portions, and top and bottom portions 113a and 113b, and a lock plate insertion groove 115, which is formed by the front portion, side portions, and top and bottom portions 113a and 113b and has an open back, is formed in the lock plate insertion portion 113.

The top portion 113a and the bottom portion 113b of the lock plate insertion portion 113 come into contact with the case 100. In more detail, the top portion 113a and the bottom portion 113b of the lock plate insertion portion 113 come into contact with the vertical tension ribs 512 and a bottom surface of the lock plate 500, respectively.

Both left and right sides of the lock plate insertion portion 113 are formed to protrude frontward such that the horizontal ribs 511 of the lock plate 500 are easily inserted therein.

One though hole, into which the insertion rod 725 of the stay rod 700 is vertically inserted, is formed in each of left and right sides of the lock plate insertion portion 113. The through hole is also formed in each of the top and bottom portions 113a and 113b of the lock plate insertion portion 113 and communicates with the lock plate insertion groove 115. Among the through holes, the through hole formed in the top portion 113a communicates with a stay rod insertion groove formed in a stay rod insertion portion 117 which will be described. Accordingly, the insertion rod 725 may be inserted into the through hole, the lock plate insertion groove 115, and the stay rod insertion groove at the same time.

Three through holes 123 capable of confirming whether the lock plate 500 is inserted or not are arranged laterally to be spaced apart from one another in the front portion of the lock plate insertion portion 113.

The through holes 123 are formed to pass horizontally the front portion.

The through holes 123 are arranged between the through holes of the both sides into which the insertion rods 725 are inserted.

Two of the through holes of the left and right sides are formed at a part of the lock plate insertion portion 113 which protrudes frontward and are located in front of the horizontal tension ribs 511 of the lock plate 500.

Grooves 114 with open rear, top, and bottom portions are formed at the bottom portion 113b of the lock plate insertion portion 113.

One groove 114 is formed at each of the left and right sides of the lock plate insertion portion 113, and a total of two grooves 114 are formed.

The grooves 114 are arranged farther rear than the through holes into which the insertion rods 725 are inserted.

A top of the groove 114 communicates with the lock plate insertion groove 115. Due to this, the body 510 of the lock plate 500 which is inserted into the lock plate insertion groove 115 is exposed outward by the groove 114. Here, a degree of exposure of the body 510 varies according to a position where the lock plate 500 has slid.

Meanwhile, an engaging protrusion 121, which protrudes downward, is formed at a rear of the top portion 113a of the lock plate insertion portion 113.

Three engaging protrusions 121 are arranged laterally to be spaced apart between the grooves 114 of the both sides.

The engaging protrusion 121 includes an inclined surface which inclines downward from a rear toward a front and an engaging surface formed at a front top of the inclined surface when viewed directly from the left or right. Due to this, a rear surface of the body 510 is engaged with the engaging surface such that the lock plate 500 inserted in the lock plate insertion groove 115 is not released from the lock plate insertion portion 113. To this end, it is necessary to form a vertical distance between a bottom end of the engaging protrusion 121 and the bottom portion 113b of the lock plate insertion portion 113 to be smaller than a vertical thickness of the body 510 of the lock plate 500.

Ribs 113c are formed on both left and right sides of the top portion 113a of the lock plate insertion portion 113 in a horizontal direction.

The ribs 113c are formed on a bottom surface of the top portion 113a such that one rib 113c is located on each of both sides of the insertion rod 725 of the body 510.

A release hole 101 is formed to vertically pass through a bottom surface of the case 100, and more particularly, in a center of the bottom portion 113b of the lock plate insertion portion 113.

A tool may be inserted into the release hole 101 such that the lock plate 500 slides horizontally.

The release hole 101 communicates with a hole 503 formed in a center of the body 510 of the lock plate 500.

A horizontal length of the release hole 101 is longer than a horizontal length of the hole 503. In more detail, the horizontal length of the release hole 101 is formed to be longer than the horizontal length of the hole 503 by at least as long as a horizontal length of the first flat surface of the engaging groove 711. This is because the lock plate 500 is allowed to slide to be released from the engaging grooves 711.

Also, the stay rod insertion portions 117 into which the stay rod 700 is inserted are formed on both left and right sides of the case 100 to be arranged on left and right of the protruding portion 111.

The stay rod insertion portion 117 is disposed on each of the left and right sides of the case 100, and a total of two stay rod insertion portions 117 are arranged thereon.

The stay rod insertion portion 117 is formed to have a cylindrical shape corresponding to an external shape of the insertion rod 725.

A bottom of the stay rod insertion portion 117 is connected to the lock plate insertion portion 113.

The stay rod insertion groove, which is a space formed by being surrounded by the stay rod insertion portions 117, is formed to have an open bottom.

The vertical rods 710 of the stay rod 700 are inserted into the stay rod insertion grooves.

A vertical length of the stay rod insertion portion 117 is longer than a vertical length of the protruding portion 111.

*107A lateral length between the both stay rod insertion portions 117 is shorter than a lateral length of the lock plate insertion portion 113.

<Lock Plate 500>

The lock plate 500 inserted in the lock plate insertion groove 115 is slidable horizontally with respect to the case 100 and the stay rod 700.

The lock plate 500 vertically fixes a position of the stay rod 700.

Tension ribs integrated with the body 510 are arranged between the lock plate 500 and the case 100.

In the embodiment, the tension ribs are connected as cantilevers to the body 510 of the lock plate 500. In the description, one end of the tension rib is a free end and the other end is a fixed end.

The tension ribs include the horizontal tension ribs 511 and vertical tension ribs 512 which have been described above.

Each of the horizontal tension ribs 511 and the vertical tension ribs 512 apply elastic forces to the lock plate 500 in a horizontal direction or a vertical direction of the lock plate 500.

—Vertical Tension Ribs 512—

In the embodiment, the vertical tension ribs 512 may be arranged on the top and bottom of the lock plate 500, and in the embodiment, are arranged on the top of the lock plate 500. In more detail, a total of two vertical tension ribs 512 are arranged between the horizontal tension ribs 511 on a left and right thereof.

The vertical tension ribs 512 are formed to have a rectangular cross section which includes a horizontal length longer than a lateral length when viewed from above or below.

In the embodiment, a free end of the left vertical tension rib 512 is disposed in the rear and a free end of the right vertical tension rib 512 is disposed in front. That is, the left vertical tension rib 512 and the right vertical tension rib 512 are inversely arranged. Accordingly, since the vertical tension rib 512 equally presses front and rear sides of the body 510, the lock plate 500 inserted in the lock plate insertion groove 115 may be disposed to be parallel to a horizontal direction.

The vertical tension rib 512 includes a bent portion, which comes into contact with the top portion 113a of the lock plate insertion portion 113, at an uppermost end thereof. The bent portion has an upwardly convex shape. Accordingly, both ends of the vertical tension rib 512 are arranged to be spaced apart from the case 100.

The bent portion of the vertical tension rib 512 is disposed approximately in a center between the front and rear sides of the body 510.

Meanwhile, a vertical tension rib insertion groove 512a is formed in the body 510 along an external shape of the vertical tension rib 512. Due thereto, when the vertical tension rib 512 is pressed by the case 100 to be compressed and deformed while the lock plate 500 is in a state of being assembled with the case 100, since a free end of the vertical tension rib 512 may be inserted into the vertical tension rib insertion groove 512a, the free end of the vertical tension rib 512 is prevented from being engaged with the case 100 when the lock plate 500 is moved.

In order to connect the fixed end of the vertical tension rib 512 to the body 510, the vertical tension rib insertion groove 512a is formed to vertically pass through the body 510.

Meanwhile, a though hole 501, into which the insertion rod 725 of the stay rod 700 is inserted, is formed to vertically pass through each of left and right sides of the body 510.

The through hole 501 is disposed to be closer to both left and right ends of the body 510 than the horizontal tension rib 511.

The through hole 501 is surrounded by flat surfaces which are inner surfaces of the body 510. Here, among the flat surfaces, a flat surface disposed in front is formed laterally and faces the second flat surface of the engaging groove 711 of the stay rod 700.

Meanwhile, the first flat surface and the third flat surface of the insertion rod 725 face top and bottom surfaces between a front surface of the body 510 and the through hole 501.

—Horizontal Tension Rib 511—

The horizontal tension rib 511 may be disposed in front or rear of the lock plate 500 and is disposed in front of the lock plate 500 in the embodiment.

The body 510 and the horizontal tension rib 511 are arranged horizontally and laterally to be flush with each other.

The horizontal tension ribs 511 are arranged on left and right sides of the body 510 while one horizontal tension rib 511 is disposed between the left through hole 501 and the left vertical tension rib 512 and one horizontal tension rib 512 is disposed between the right through hole 501 and the right vertical tension rib 512.

In the embodiment, the left horizontal tension rib 511 and the right horizontal tension rib 511 are arranged to be bilaterally symmetrical to each other on the basis of the center of the lock plate 500.

One side of the horizontal tension rib 511 comes into contact with the case 100, and the other side thereof is connected to the lock plate 500. A plurality of curved pieces spaced apart may be formed between the one side and the other side of the horizontal tension rib 511.

The curved pieces include first curved pieces 534a and 534b and a second curved piece 536.

The horizontal tension rib 511 includes the first curved pieces 534a and 534b connected to the one side, the second curved piece 536 formed between the first curved pieces 534a and 534b and the lock plate 500, and a first linear piece 535 formed between the first curved pieces 534a and 534b and the second curved piece 536.

The first curved pieces 534a and 534b and the second curved piece 536 have an arc shape, and the first curved pieces 534a and 534b are located farther inside than the second curved piece 536. Accordingly, the second curved piece 536 is disposed to be surrounded by the first curved pieces 534a and 534b.

One side 532 of the horizontal tension ribs 511 which comes into contact with the case 100 may be located farther leftward or rightward than the curved piece and may be located between one side of the body 510 and one side of the case 100. In more detail, the one side 532 of the horizontal tension rib 511 is located between the front surface of the body 510 and the front portion of the lock plate insertion portion 113.

A curved portion 532, which is one side of the horizontal tension rib 511 coming into contact with the case 100, is formed between both one and other sides of the horizontal tension rib 511.

The curved portion 532 is located farther frontward than the first curved pieces 534a and 534b and the second curved piece 536. In addition, the curved portion 532 is disposed at a foremost part of the horizontal tension rib 511. Accordingly, both the one and other sides of the horizontal tension rib 511 are disposed to be spaced apart from the front portion of the lock plate insertion portion 113 with which the curved portion 532 comes into contact.

Due thereto, when the lock plate 500 and the case 100 are assembled with each other, the curved portion 532 comes into contact with the front portion of the lock plate insertion portion 113 such that the horizontal tension rib 511 is compressed and deformed. The deformed horizontal tension rib 511 applies an elastic force backward to be farther away from the front portion of the lock plate insertion portion 113.

In the case of the right horizontal tension rib 511, the curved portion 532 is located farther right than the curved piece. In the case of the left horizontal tension rib 511, the curved portion 532 is located farther left than the curved piece.

Hereinafter, the horizontal tension rib 511 is described in more detail on the basis of the horizontal tension rib 511 disposed on a right side.

The horizontal tension rib 511 includes a first inclined piece 531 inclined frontward from one end toward the curved portion 532, the curved portion 532 connected to the other end of the first inclined piece 531 and convex frontward, a second inclined piece 533 connected to the other end of the curved portion 532 and inclined backward toward the other end of the second inclined piece 533, the first curved pieces 534a and 534b connected to the other end of the second inclined piece 533, the first linear piece 535 extending leftward from other ends of the first curved pieces 534a and 534b, the second curved piece 536 connected to the other end of the first linear piece 535, a second linear piece 538 extending rightward from the other end of the second curved piece 536, and a narrow-and-broad piece 537 having a horizontal length extending from the other end of the second linear piece 538 toward a right side.

One end of the first inclined piece 531 is one end of the horizontal tension rib 511, and the other end of the narrow-and-broad piece 537 is the other end of the horizontal tension rib 511.

The curved portion 532 is disposed in front of a central part in a lateral direction of the through hole 501.

One ends of the first curved pieces 534a and 534b are arranged between the front surface of the body 510 and the curved portion 532.

The first curved pieces 534a and 534b are formed by connecting curved pieces having two different curvatures. In more detail, the first curved pieces 534a and 534b include a 1-1 curved piece 534a connected to the other end of the second inclined piece 533 and a 1-2 curved piece 534b connected to the other end of the 1-1 curved piece 534a.

The 1-1 curved piece 534a has a shape corresponding to an arc, and the arc is referred to as an arc of the 1-1 curved piece 534a. In the case of other curved pieces in addition to the 1-1 curved piece 534a, arcs thereof will be described while complying with the above rule.

On the basis of a center point of each arc, the 1-1 curved piece 534a has a spiral shape bent by about 180 degrees from the other end of the second inclined piece 533 toward a rear of a right side, and the 1-2 curved piece 534b has a spiral shape bent by about 90 degrees from the other end of the 1-1 curved piece 534a toward a front of a left side.

A curvature of the arc corresponding to the 1-1 curved piece 534a is smaller than a curvature of the 1-2 curved piece 534b or a curvature of an arc corresponding to the second curved piece 536.

A connecting part between the 1-1 curved piece 534a and the 1-2 curved piece 534b is disposed between the vertical tension rib 512 and the through hole 501 while being farther front than a center of front and rear sides of the body 510.

The second curved piece 536 is disposed in a front of the body 510. In more detail, the other end of the second curved piece 536 is disposed on the front surface of the body 510. That is, the other end of the second curved piece 536 forms the front surface of the body 510.

The second curved piece 536 has an arc shape which is a spiral shape bent by about 180 degrees.

The second curved piece 536 is formed to have a width which gradually increases from one side toward the other side. Due thereto, since the first curved pieces 534a and 534b are spaced apart at the same distance from the second curved piece 536, it is difficult for the first curved pieces 534a and 534b to come into contact with the second curved piece 536 such that an elastic effect of the lock plate 500 is high.

A lateral length of the first linear piece 535 is slightly shorter than half a radius of the arc of the 1-1 curved piece 534a. In other words, the lateral length of the first linear piece 535 is equal or similar to the distance between the 1-1 curved pieces and the second curved piece 536.

A front surface of the second linear piece 538 is disposed on the front surface of the body 510. That is, the front surface of the second linear piece 538 forms the front surface of the body 510.

A lateral length of the second linear piece 538 is similar to the lateral length of the first linear piece 535.

A horizontal length of the second linear piece 538 is longer than a horizontal length of the first linear piece 535.

A front surface of the narrow-and-broad piece 537 is disposed to be parallel to the front surface of the body 510 and forms a part of the front surface of the body 510. The front surface of the narrow-and-broad piece 537 is formed to be a flat surface which is parallel laterally.

A lateral length of the narrow-and-broad piece 537 is similar to the lateral length of the second linear piece 538.

A through hole, into which a part of the horizontal tension rib 511 excluding the first and second inclined pieces 531 and 533, the curved portion 532, and a part of the 1-1 curved piece 534a is inserted, is formed in the body 510 of the lock plate 500. The through hole is formed to pass vertically through the body 510 and has an open front. The through hole has a shape corresponding to the curved pieces 534a, 534b, and 536 of the horizontal tension rib 511 and the first and second linear pieces 535 and 538.

An elastic effect of the horizontal tension rib 511 is as follows.

First, the horizontal tension rib 511 pressed by the case 100 applies an elastic force to the rear of the body 510 of the lock plate 500 such that the elastic force is reduced, by a certain level, by the curved portion 532 and the first curved pieces 534a and 534b and then is transferred to the first linear piece 535. Here, since the elastic force approximately perpendicularly intersects with the first linear pieces 535 laterally parallel thereto, the first linear pieces 535 may more significantly reduce the elastic force than the first curved pieces 534a and 534b. Here, when the elastic force is not entirely reduced at the first linear pieces 535, the residual elastic force is transferred to the second curved pieces 536 and further reduced once more. Afterwards, when the elastic force is not entirely reduced at the second curved pieces 536, the residual elastic force is transferred to the second linear pieces 538. Here, since the elastic force approximately intersects with the second linear pieces 538 parallel laterally, the second linear pieces 538 reduce the elastic force more significantly than the second curved pieces 536. Also, when the elastic force is not entirely reduced at the second linear pieces 538, the residual elastic force is transferred to the body 510 and entirely reduced. Accordingly, in the present invention, due to a high elastic force of the lock plate 500 which functions as a plate spring, the lock plate 500 has a long life in comparison to a conventional technology.

Hereinafter, an action of the embodiment having the above-described configuration will be described.

In order to vertically move the HR, while a tool is inserted into the release hole 101 and the hole 503 of the lock plate 500 and comes into contact with an inner circumferential surface of the hole 503, when the lock plate 500 is pushed forward by using the tool, the horizontal tension rib 511 is compressed and deformed to reduce a horizontal width such that the body 510 slides frontward. Due to this, the body 510 inserted in the engaging grooves 711 of the stay rod 700 is released from the engaging grooves 711. Accordingly, the HR fixed to the case 100 may be vertically moved.

In this state, in order to move the HR to an original position again, a force of pushing the lock plate 500 frontward is removed using the tool. Due thereto, when the compression of the horizontal tension rib 511 is released, the horizontal tension rib 511 is restored. Simultaneously, when the body 510 is inserted into the engaging grooves 711 again by moving the HR, a position of the HR is fixed.

Hereinafter, a locking device applied to the embodiment of the present invention will be described.

The locking device of the embodiment includes a bracket 810 including a front plate and left and right plates, the stay rod 700 mounted on the HR and rotated with respect to the bracket 810 to move between an unfolded (upright) position and a folded position, a locking mechanism which locks the stay rod 700 in the upright position with respect to the bracket 810, and a pulling member 800 which is an operating member which operates to release the locking state of the locking mechanism.

The locking mechanism includes a lock link fixed to the lateral rod 720, a first distortion coil spring 820 which has one end supported by the bracket 810 and the other end supported by the lateral rod 720, a release lever, a ratchet rotatably supported by the bracket 810 and released from contact with the lock link by an operation of the release lever, a second distortion coil spring having one end supported by the bracket 810 and the other end supported by the release lever, and a third distortion coil spring for returning the ratchet.

In the locking device configured as describe above, when the pulling member 800 is pulled down from the unfolded position, the release lever rotates clockwise and the ratchet rotates counterclockwise. When the ratchet rotates counterclockwise, the stay rod 700 rotates (revolves) due to the first distortion coil spring 820 and moves to the folded position. That is, a rotational center of the lateral rod 720 of the stay rod 700 is changed.

A more detailed description of the locking device refers to Patent Document 1. The above-described HR locking device according to the present invention is applicable to types disclosed in Patent Documents 2 to 5, is applicable to a folded type as disclosed in Patent Document 1, and is applicable to a mechanism in which the stay rod 700 is fixed to a seat SB of a vehicle.

Also, according to the present invention, fixing the stay rod 700 to the HR may be applied to the seat SB.

That is, the present invention is applicable to any mechanism in which the seat SB and the HR are connected by the stay rod 700.

Although the exemplary embodiments of the present invention have been described above, a variety of modifications or changes of the present invention may be made by those skilled in the art without departing from the concept and scope of the present invention disclosed in the following claims.

DESCRIPTION OF REFERENCE NUMERALS

Description of Main Parts in Drawings

100: case, 101: release hole
111: protruding portion, 113: lock plate insertion portion
113a: top portion, 113b: bottom portion
113c: rib, 114: groove
115: lock plate insertion groove, 117: stay rod insertion portion
121: engaging protrusion, 123: through hole
500: lock plate, 501: through hole
503: hole, 510: body
511: horizontal tension rib, 512: vertical tension rib
512a: vertical tension rib insertion groove, 531: first inclined piece
532: curved portion, 533: second inclined piece
534a: 1-1 curved piece, 534b: 1-2 curved piece
535: first linear piece, 536: second curved piece
537: narrow-and-broad piece, 538: second linear piece
700: stay rod, 710: vertical rod
711: engaging groove, 720: lateral rod
721: vertical rod, 723: inclined rod
725: insertion rod, 800: pulling member
810: bracket, 820 first coil spring

What is claimed is:

1. A headrest locking device comprising:
a case; and
a lock plate slidably accommodated in the case and inserted in an engaging groove of a stay rod,
wherein a horizontal tension rib is located between the lock plate and the case,
wherein the horizontal tension rib applies an elastic force to the lock plate in a direction different from a sliding direction of the lock plate, and
wherein the lock plate has a panel shape formed by integrating a body inserted into the engaging groove with the horizontal tension rib,
wherein a vertical tension rib, which applies an elastic force in a direction not parallel to the sliding direction of the lock plate, is formed at the lock plate.

2. The headrest locking device of claim 1, wherein one side of the horizontal tension rib comes into contact with the case, and the other side thereof is connected to the lock plate, and
wherein a plurality of curved pieces are formed spaced apart between the one side and the other side at of the horizontal tension rib.

3. The headrest locking device of claim 2, wherein the horizontal tension rib comprises a first curved piece connected to the one side, a second curved piece formed between the first curved piece and the lock plate, and a linear piece formed between the first curved piece and the second curved piece.

4. The headrest locking device of claim 3, wherein the first curved piece and the second curved piece have an arc shape, and
wherein the first curved piece is located farther inside than the second curved piece.

5. The headrest locking device according to claim 2, wherein one side of the horizontal tension rib which comes into contact with the case is located farther leftward or rightward than the curved piece and is located between one side of the body and one side of the case.

6. A headrest locking device comprising:
a case; and
a lock plate slidably accommodated in the case and inserted in an engaging groove of a stay rod,
wherein a horizontal tension rib is located between the lock plate and the case,
wherein the horizontal tension rib applies an elastic force to the lock plate in a direction different from a sliding direction of the lock plate, and
wherein the lock plate has a panel shape formed by integrating a body inserted into the engaging groove with the horizontal tension rib,
wherein one side of the horizontal tension rib comes into contact with the case, and the other side thereof is connected to the lock plate, and
wherein a plurality of curved pieces are formed spaced apart between the one side and the other side of the horizontal tension rib.

7. The headrest locking device of claim 6, wherein the horizontal tension rib comprises a first curved piece connected to the one side, a second curved piece formed between the first curved piece and the lock plate, and a linear piece formed between the first curved piece and the second curved piece.

8. The headrest locking device of claim 7, wherein the first curved piece and the second curved piece have an arc shape, and
wherein the first curved piece is located farther inside than the second curved piece.

9. The headrest locking device according to claim 6, wherein one side of the horizontal tension rib which comes into contact with the case is located farther leftward or rightward than the curved piece and is located between one side of the body and one side of the case.

10. The headrest locking device according to claim 6, wherein a vertical tension rib, which applies an elastic force in a direction not parallel to the sliding direction of the lock plate, is formed at the lock plate.

* * * * *